(12) United States Patent
Messmer et al.

(10) Patent No.: US 9,190,014 B2
(45) Date of Patent: Nov. 17, 2015

(54) DATA TRANSMISSION USING OUT-OF-GAMUT COLOR COORDINATES

(75) Inventors: Neil W. Messmer, Langley (CA); Lewis Johnson, Delta (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 165 days.

(21) Appl. No.: 13/819,995

(22) PCT Filed: Sep. 7, 2011

(86) PCT No.: PCT/US2011/050647
§ 371 (c)(1),
(2), (4) Date: Feb. 28, 2013

(87) PCT Pub. No.: WO2012/036947
PCT Pub. Date: Mar. 22, 2012

(65) Prior Publication Data
US 2013/0162666 A1 Jun. 27, 2013

Related U.S. Application Data

(60) Provisional application No. 61/382,449, filed on Sep. 13, 2010.

(51) Int. Cl.
*G09G 5/00* (2006.01)
*G09G 5/02* (2006.01)
*H04N 5/202* (2006.01)
(Continued)

(52) U.S. Cl.
CPC ............. *G09G 5/02* (2013.01); *H04N 1/6058* (2013.01); *H04N 9/67* (2013.01); *H04N 19/46* (2014.11); *G09G 2340/06* (2013.01); *H04N 19/186* (2014.11)

(58) Field of Classification Search
USPC ................. 345/489–590, 591, 600, 619, 690;
348/254–256, 552–553, 557, 563, 569,
348/630, 708; 358/518–519, 523, 537, 452;
382/162, 166, 167, 232–233, 235, 254,
382/274, 276
See application file for complete search history.

(56) References Cited

U.S. PATENT DOCUMENTS 6,439,465 B1 8/2002 Bloomberg
6,590,996 B1 7/2003 Reed
(Continued)

FOREIGN PATENT DOCUMENTS

CN 1383558 12/2002
CN 101188749 5/2008
(Continued)

OTHER PUBLICATIONS

Specht, Michael "Using Perceptually Uniform Color Spaces for Image Steganography" Mar. 15, 2006, Department of Computer Science, Otto-von-Guericke-Universitat Magdeburg, Germany.
(Continued)

*Primary Examiner* — Wesner Sajous

(57) ABSTRACT

Methods for transmitting additional information together with image data involve replacing pixel values to take in-gamut points to out-of-gamut points. The additional information may constitute metadata describing the image data and/or useful for controlling display and/or processing of the image data; watermark information; or other information. In some embodiments the image data is restored to its original form after extraction of the additional information.

16 Claims, 7 Drawing Sheets

(51) Int. Cl.

| | | |
|---|---|---|
| H04N 5/46 | (2006.01) | |
| H04N 5/445 | (2011.01) | |
| H04N 9/64 | (2006.01) | |
| G06K 9/36 | (2006.01) | |
| G06K 9/00 | (2006.01) | |
| G06K 9/40 | (2006.01) | |
| H04N 1/60 | (2006.01) | |
| H04N 9/67 | (2006.01) | |
| H04N 19/46 | (2014.01) | |
| H04N 19/186 | (2014.01) | |

(56) References Cited

U.S. PATENT DOCUMENTS

| | | | |
|---|---|---|---|
| 6,611,273 B2 | 8/2003 | Stokes | |
| 6,614,914 B1 | 9/2003 | Rhoads | |
| 6,640,005 B1 | 10/2003 | Westerman | |
| 6,718,046 B2 | 4/2004 | Reed | |
| 6,721,440 B2 | 4/2004 | Reed | |
| 6,763,123 B2 | 7/2004 | Reed | |
| 6,763,124 B2 | 7/2004 | Alattar | |
| 6,804,377 B2 | 10/2004 | Reed | |
| 6,882,738 B2 | 4/2005 | Davis | |
| 6,891,959 B2 | 5/2005 | Reed | |
| 6,973,195 B1 | 12/2005 | Matsui | |
| 6,993,149 B2 | 1/2006 | Brunk | |
| 6,996,252 B2 | 2/2006 | Reed | |
| 7,027,614 B2 | 4/2006 | Reed | |
| 7,194,635 B1 | 3/2007 | Yoda | |
| 7,391,880 B2 | 6/2008 | Reed | |
| 7,545,541 B2 | 6/2009 | Dalrymple | |
| 7,561,714 B2 | 7/2009 | Tian | |
| 7,616,777 B2 | 11/2009 | Rodriguez | |
| 2002/0021824 A1 | 2/2002 | Reed | |
| 2004/0170319 A1* | 9/2004 | Maurer | 382/167 |
| 2004/0263911 A1 | 12/2004 | Rodriguez | |
| 2005/0099506 A1 | 5/2005 | Stokes | |
| 2005/0169544 A1 | 8/2005 | Clark | |
| 2006/0008112 A1 | 1/2006 | Reed | |
| 2008/0189732 A1 | 8/2008 | Auwens | |
| 2009/0080769 A1 | 3/2009 | Kagawa | |
| 2009/0201309 A1* | 8/2009 | Demos | 345/589 |
| 2009/0238456 A1 | 9/2009 | Fukasawa | |
| 2012/0229495 A1* | 9/2012 | Longhurst | 345/590 |
| 2012/0315011 A1* | 12/2012 | Messmer et al. | 386/230 |
| 2012/0321273 A1* | 12/2012 | Messmer | 386/224 |
| 2013/0076763 A1* | 3/2013 | Messmer | 345/506 |
| 2013/0120656 A1* | 5/2013 | Wilson et al. | 348/563 |

FOREIGN PATENT DOCUMENTS

| | | |
|---|---|---|
| CN | 101601068 | 12/2009 |
| EP | 1771012 | 4/2007 |
| JP | 2000-216984 | 8/2000 |
| JP | 2007-036652 | 2/2007 |
| WO | 2008/096281 | 8/2008 |

OTHER PUBLICATIONS

Cheddad, A et al. "Digital Image Steganography: Survey and Analysis of Current Methods" Signal Processing, Elsevier Science Publishers B.V. Amsterdam, NL, vol. 90, No. 3, Mar. 1, 2010, pp. 727-752.

* cited by examiner

DATA TRANSMISSION USING OUT-OF-GAMUT COLOR COORDINATES

CROSS-REFERENCE TO RELATED APPLICATIONS

This application claims priority to U.S. Provisional Patent Application No. 61/382,449 filed 13 Sep. 2010, hereby incorporated by reference in its entirety.

TECHNICAL FIELD

The invention relates to transmission of information. The invention has example application in transmitting metadata relating to still or video images.

BACKGROUND

Metadata may be used to guide the display of image data. Metadata may, for example, convey a wide range of information such as locations and types of light sources depicted in an image; protected colors that should not be altered; statistical information regarding an image that may be of use in decoding and/or displaying a high quality version of the image; information regarding how image data has been encoded; and so on.

Metadata may be transmitted between a source and a display via any suitable data communication channel however it can be undesirable to have to set up separate communication channels for image data and related metadata. The inventors have recognized that there is a need for ways to provide metadata or other information in a format that facilitates delivery of the metadata together with image data. There is a particular need for such formats which allow image data packaged for delivery together with metadata or other information to be carried by a standard image data transmission fabric.

SUMMARY OF THE INVENTION

This invention has a number of aspects. One aspect provides methods for transmitting information in image data. The image data may, for example, comprise still or video images. Another aspect provides apparatus and methods for encoding information in image data. Another aspect provides apparatus and methods for extracting information that has been encoded in image data.

One aspect provides a method for encoding additional information in image data, the image data comprising pixel values defining a plurality of in-gamut points within a gamut for a plurality of pixels, the method comprising selecting one or more of the pixels, and mapping one or more pixel values of each of the selected pixels to one or more corresponding mapped values, wherein at least one of the one or more mapped values defines an out-of-gamut point and at least one of the one or more mapped values corresponds to one or more bits of the additional information. In some embodiments, the out-of-gamut point corresponds to the one or more bits of the additional information. In some embodiments, at least one of the one or more mapped values corresponds to at least one of the one or more pixel values.

One aspect provides a method for decoding additional information encoded in image data, the image data comprising pixels values defining a plurality of in-gamut points within a gamut and one or more out-of-gamut points for a plurality of pixels, the method comprising identifying one or more pixel values of an out-of-gamut pixel in the image data, the one or more pixel values defining an out-of-gamut point, identifying one or more bits of additional information corresponding to the one or more identified pixel values, and outputting the one or more bits. In some embodiments, the method comprises mapping at least one of the one or more identified pixel values to corresponding mapped values defining an in-gamut point.

One aspect provides apparatus for encoding additional information in image data, the image data comprising pixel values defining a plurality of in-gamut points within a gamut for a plurality of pixels, the apparatus comprising a pixel selection unit configured to select one or more of the pixels, and a pixel modification unit configured to map one or more pixel values of each of the selected pixels to one or more corresponding mapped values, wherein at least one of the one or more mapped values defines an out-of-gamut point and at least one of the one or more mapped values corresponds to one or more bits of the additional information.

One aspect provides apparatus for decoding additional information encoded in image data, the image data comprising pixels values defining a plurality of in-gamut points within a gamut and one or more out-of-gamut points for a plurality of pixels, the apparatus comprising a modified pixel detection unit configured to detect out-of-gamut pixels in the image data and a data extractor configured to extract one or more bits of additional information corresponding to pixel values of out-of-gamut pixels detected by the modified pixel detection unit. In some embodiments, the apparatus comprises a pixel value restoring unit configured to map the pixel values of the out-of-gamut pixels defining out-of-gamut points to corresponding restored values defining in-gamut points.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides methods and apparatus for transmitting information in color image data. The image data may specify a still image or a video image, for example.

Color image data specifies pixel values in a color space. Some example color spaces are LUV, Yuv, and Ycrcb. In many cases pixel values comprise a plurality of color coordinates. Color coordinates may include one or more coordinates indicative of luminance and one or more coordinates indicative of color (chroma). For example, in the LUV color space, the coordinate L indicates luminance while the coordinates U and V are chroma values.

The color coordinate values typically have some valid range(s). For example, a format may allow a particular color coordinate to have values in the range of 0 to 255 or 1024 or 4096 (excluding any reserved values). The color space of all possible combinations of valid color coordinates may encompass various points (i.e. sets of color coordinates) that are out-of-gamut for a particular image data format. That is, an image data format may specify that color points should lie within a particular gamut. However, there may be combinations of valid color coordinate values that specify points lying outside of the gamut.

This invention encodes information at least in part by including out-of-gamut color points in image data. The out-of-gamut points map to in-gamut points such that the image may be properly reproduced at a display.

Figure 1:
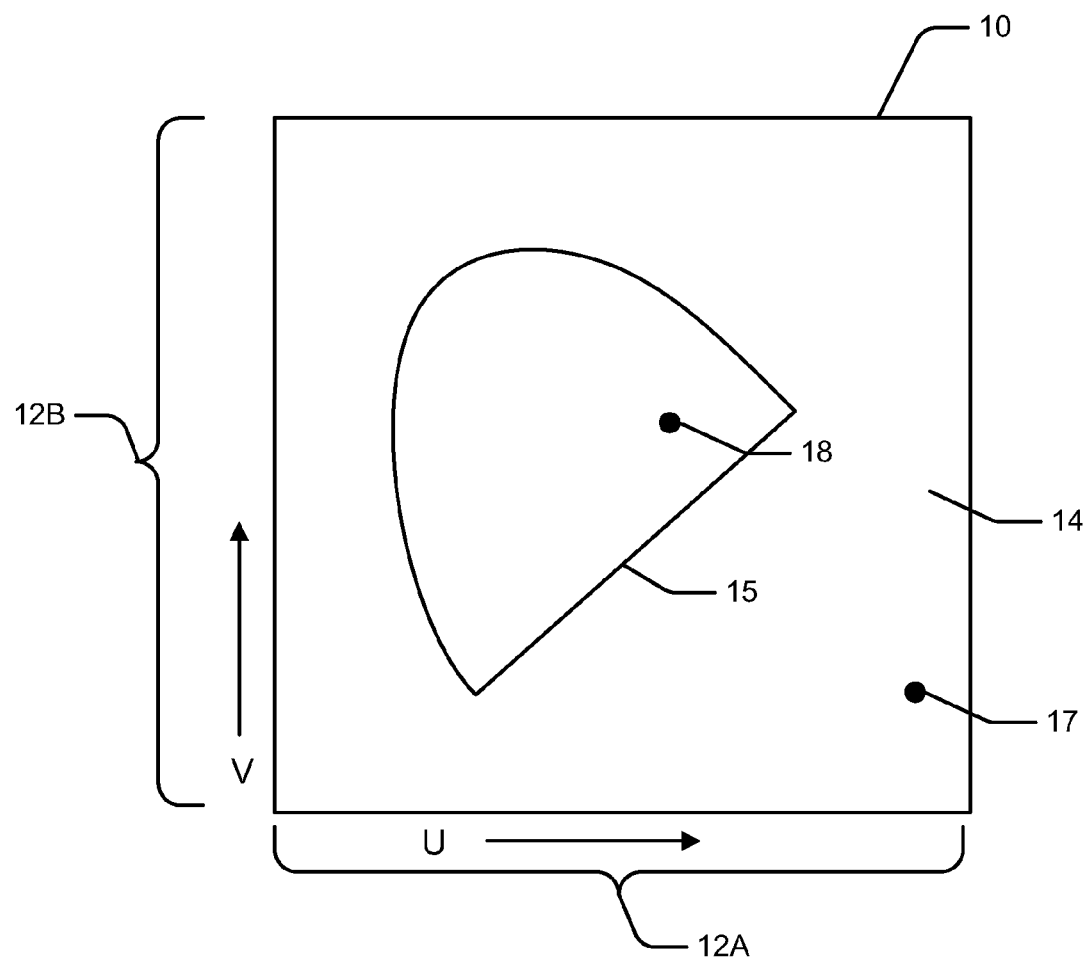
FIG. 1 is a diagram illustrating an example color space.

FIG. 1 illustrates a plane 10 in a color space. In the illustrated embodiment, the plane is a constant-luminance plane. Points in plane 10 are specified by values of a pair of color coordinates U and V. Coordinate U has a valid range 12A and coordinate V has a valid range 12B. Coordinates U and V can therefore specify points within an area 14 of plane 10. In the illustrated embodiment, area 14 is rectangular.

Also shown in FIG. 1 is a portion of gamut boundary 15. All pixel values in image data may lie within gamut boundary 15. However, coordinates U and V can specify points outside of gamut boundary 15. Such points are out-of-gamut points. Point 17 is an example of an out-of-gamut point. Points that are within (including lying on) gamut boundary 15 are in-gamut points. Point 18 is an example of an in-gamut point.

Figure 2:
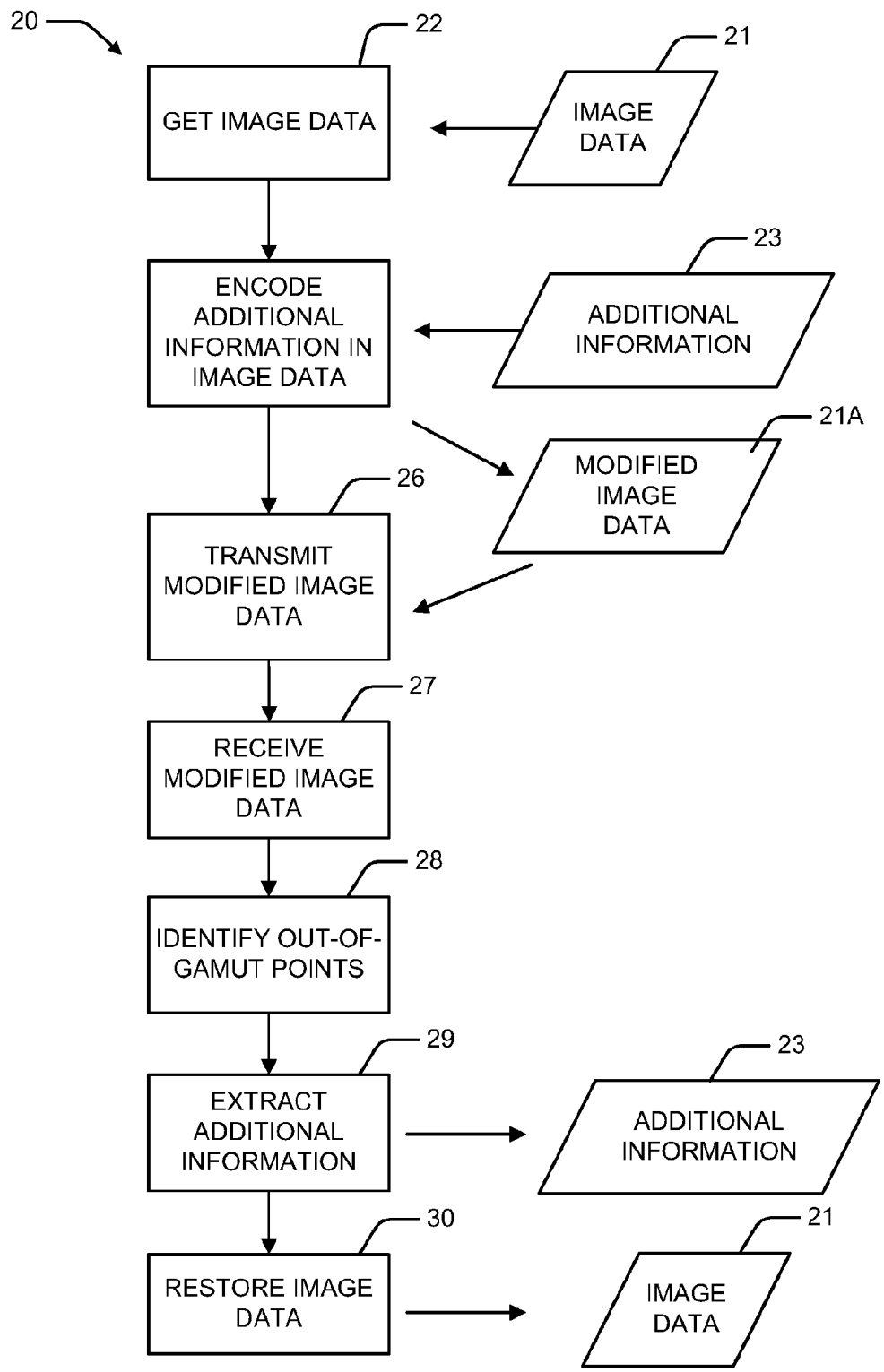
FIG. 2 is a flowchart illustrating a method according to an example embodiment.

Since out-of-gamut points do not exist naturally in image data, the presence of out-of-gamut points may be used to encode information. FIG. 2 shows a method 20 according to an example embodiment. Method 20 obtains image data 21 in block 22. Image data 21 comprises sets of in-gamut color points corresponding to pixels of an image. In block 24 method 20 encodes some additional information 23 in image data 21 by replacing some of the in-gamut color points with out-of-gamut color points to provide modified image data 21A. In block 26 the modified image data 21A (including the encoded information) is transmitted to a destination. In block 27 the modified image data 21A is received at the destination. In block 28 the out-of-gamut color points are identified. In block 29 the additional information is extracted. In block 30 the image data 21 is restored. Block 30 is not mandatory in all embodiments.

Figure 3:
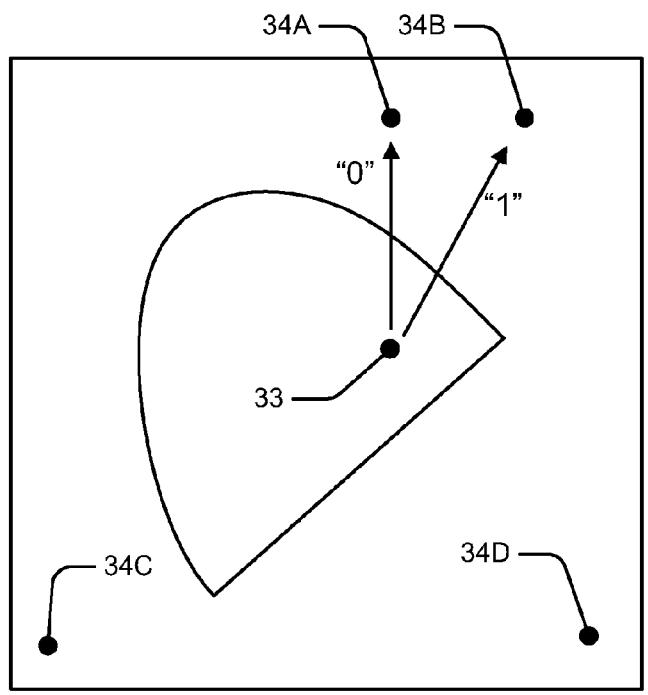
FIGS. 3 and 4 illustrate example mappings of in-gamut points to corresponding out-of-gamut points.

Out-of-gamut color points may be applied to encode information in a wide variety of ways. What follows are some examples. A first example is illustrated in FIG. 3. In the embodiment of FIG. 3, additional information is encoded by replacing an in-gamut point 33 with one of two alternative out-of-gamut points 34A and 34B. Replacement of points 33 with out-of gamut point 34A may, for example, represent logical '0's' while replacement of points 33 with out-of gamut point 34B may represent logical '1's' or vice versa. Out-of-gamut points may be associated with values of additional information according to a variety of pre-determined relationships.

This scheme may be varied by changing the number of different out-of-gamut points with which a point 33 may be replaced. For example, if point 33 can be selectively replaced with any one of points 34A, 34B, 34C and 34D then each point 33 replaced may communicate one of four possible values.

In this scheme, points 33 to be replaced may be selected in any of a variety of ways. In some embodiments, points 33 are selected based on one or more pixel values thereof. For example, in some embodiments points 33 are selected based on one or more pixel values thereof matching one or more pre-determined pixel values (e.g., pixel values defining a specific color, such as, for example, black or white). In such embodiments, image data 21 may be recreated by replacing out-of-gamut points with points having the pre-determined pixel values (e.g., points of the specific color). In some cases the specific color is chosen to be a color that is expected to occur relatively frequently in image data (thus providing the possibility for carrying more additional information in a frame of image data). This results in a relatively large number of opportunities to transmit parts of the additional information.

In some embodiments the specific color may be determined based on image data. In an example embodiment, points to be replaced in a frame of image data are selected to be those points in the frame having the same color as a pixel at a pre-determined location in the frame (e.g., the first pixel in the frame). In another example embodiment, points to be replaced in a row of pixels in the frame are selected to be those points having the same color as a pixel at a pre-determined location in the row (e.g., the first pixel in the row of pixels). In some embodiments, a pixel on which the selection of specific color is based may not be used to carry additional information (e.g., it may not be altered by the encoding of additional information in the image data).

In some embodiments multiple different in-gamut points are each associated with a plurality of out-of-gamut points and the additional information is communicated by replacing in-gamut points with a selected one of the corresponding out-of-gamut points. In such embodiments, image data 21 may be recreated by replacing out-of-gamut points with in-gamut points corresponding to the out-of-gamut point being replaced.

In an alternative embodiment, points 33 are selected as being the points associated with pixels having colors that are the same as colors for another pixel (such as an immediately-preceding pixel). With this embodiment image data 21 may be recreated by replacing out-of-gamut points with points of the same color as the another pixel.

In another embodiment, only one out-of-gamut point is associated with each in-gamut point 33. In such embodiments the presence in modified image data 21A of an in-gamut point 33 not replaced by the corresponding out-of-gamut point may indicate a logical '1' and the presence in modified image data 21A of an out-of-gamut point replacing an in-gamut point 33 may represent a logical '0' or vice versa. In this embodiment image data 21 may be recreated by replacing each out-of-gamut point with the corresponding in-gamut point.

In another embodiment, points 33 to be replaced are points for which higher-order bits of one or more color coordinates are set to zero and which would be out-of-gamut if the higher order bits of the one or more color coordinates were equal to one. For example, where a color coordinate is an 8-bit color coordinate then points 33 may comprise any points for which the color coordinate has values of less than a threshold. The threshold may, for example, be 128 or 64 (thus ensuring that at least one higher-order bit is set to zero in the coordinate). The corresponding out-of-gamut points may be achieved by setting the higher-order bits of one or more of the coordinates to one and leaving the lower-order bits of the one or more of the coordinates unchanged. In this embodiment image data 21 may be recreated by setting the higher-order bits of the coordinates of the out-of-gamut point to zero.

In some cases, there is a possibility that colors will be remapped in transit (e.g., as a result of color space conversion). This may cause out-of-gamut points in which additional information is encoded to be shifted before the additional information is extracted. In such cases, extracting the additional information may comprise determining whether or not out-of-gamut points occur in one of a plurality of non-overlapping regions of color space. As long as any remapping is not so extreme that it would re-map an out-of-gamut color from a point that is within a region corresponding to some value of the additional information to a point that is outside of the region then it will remain possible to extract the additional information despite such color remapping.

Advantageously the out-of-gamut points may be selected so as to be readily identified as out-of-gamut points. In embodiments which communicate different values by mapping an in-gamut point to one of a plurality of different corresponding out-of-gamut points, the different out-of-gamut points are advantageously chosen so as to be readily distinguished from one another.

Figure 4:
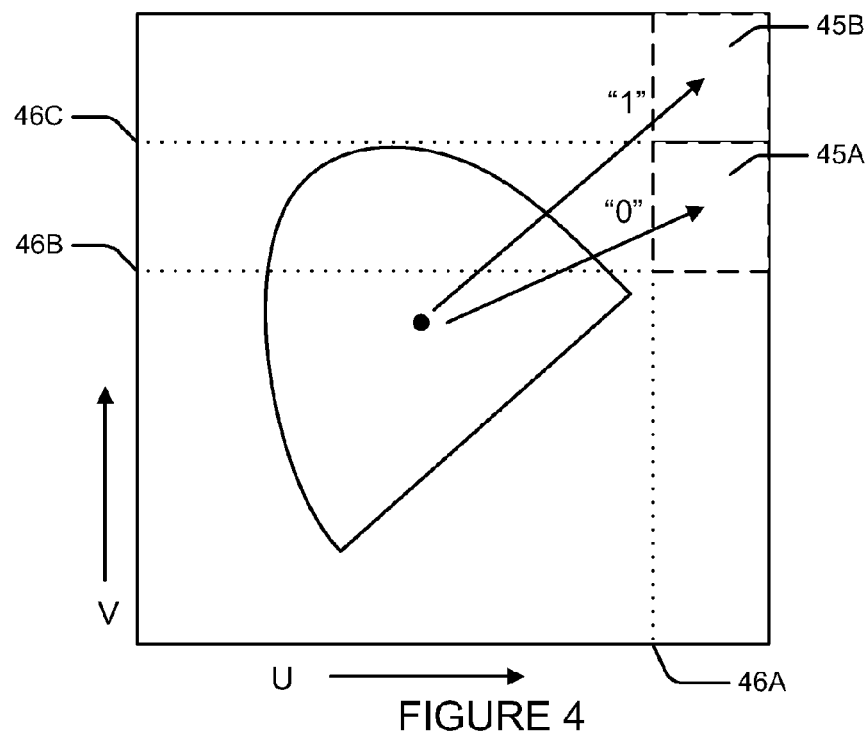

For example, in some embodiments, regions within which out-of-gamut points are located are defined in terms of threshold values to which coordinate values may be compared. For example, FIG. 4 shows an embodiment in which two, non-overlapping out-of-gamut regions 45A and 45B are defined. Out-of-gamut points in region 45A are associated with a logic value of 0. Out-of-gamut points in region 45B are associated with a logic value of 1. Points in region 45A can be readily identified since region 45A includes only points for which a value of a first coordinate (indicated as U) is above a threshold 46A and a value of a second coordinate (indicated as V) is between thresholds 46B and 46C. Similarly , points in region 45B can be identified as points for which the value of the first coordinate U is above threshold 46A and the value of the second coordinate V is above threshold 46C.

Pseudo-code corresponding to logic for decoding the additional information encoded using out-of-gamut pixels in regions 45A and 45B could operate as follows:
1. Get coordinate values for current pixel;
2. IF (coordinate 1 value<threshold 46A) OR (coordinate 2 value<threshold 46B);
3. THEN set current pixel=next pixel and return to line 1;
4. ELSE IF (coordinate 2 value<threshold 46C);
5. THEN output 0 as next bit of additional information;
6. ELSE IF (coordinate 2 value>threshold 46C);
7. THEN output 1 as next bit of additional information;
8. Replace current pixel coordinate values with coordinate values for corresponding in-gamut point.
9. Return to line 1.

The thresholds may be set at the boundaries of bit-aligned boxes to facilitate comparison of the coordinate values to the thresholds in hardware or software.

In some embodiments, additional information is written directly into lower-order bits of one or more pixel values. For example, in one example embodiment, pixels on the grey line (i.e., pixels having chroma values set to zero) are eligible to be used for carrying metadata or other additional information. Additional information may be written into lower-order bits of the chroma values (e.g. U and V) and upper order bits of the chroma values may be set so that the resulting chroma values are out-of-gamut. For example, where the chroma values are each an 8-bit value, three highest-order bits of the chroma values may be set to '1' to cause the resulting color point to be out-of gamut and 5 bits of additional information may be written to the lower-order bits of each of the chroma values.

In such embodiments, the luminance value may be unaltered. The pixel values may be restored to their original state after the additional information has been read by setting the chroma values to correspond to the grey line. In some such embodiments, the mapping of the values represented by the lower-order bits of the chroma values may be mapped 1:1 to metadata values.

Figure 5:
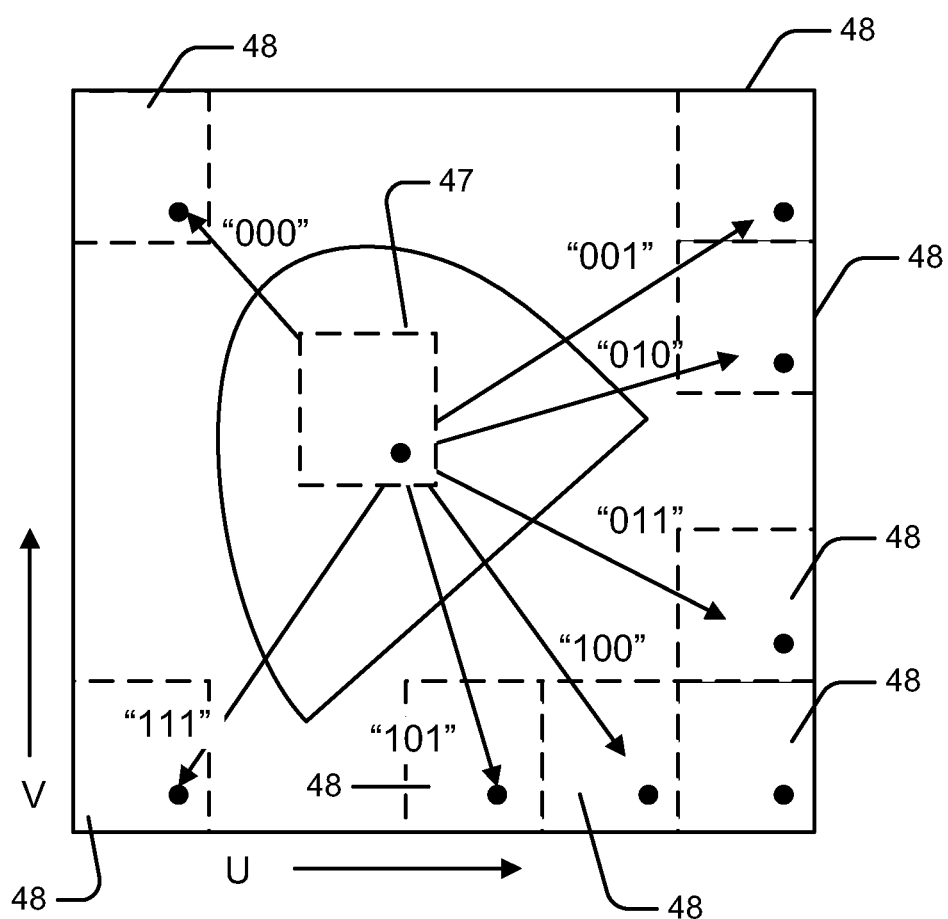
FIG. 5 illustrates an example embodiment in which a point from an in-gamut region is mapped to one of a plurality of out-of-gamut regions.

In another embodiment, illustrated in FIG. 5, a point within an in-gamut region 47 is mapped to a corresponding point in one of a plurality of non-overlapping out-of gamut regions 48. The value of the additional information encoded by this mapping is indicated by the choice of which region 48 the point is mapped to. For example, if there are 8 different out-of-gamut regions 48 then the selection of one region can represent a three-bit-value. The mapping of points within any one region 48 back to corresponding points within region 47 may be a predetermined 1:1 mapping such that image data may be restored to its original form by applying the predetermined 1:1 mapping. A different 1:1 mapping applies to each of regions 48.

In a variation of the embodiment illustrated by FIG. 5, out-of-gamut points in one region 48 are mapped to the same in-gamut point. In this embodiment, the additional information is encoded as the particular point within a region 48 to which the in-gamut point is mapped (e.g. the additional information is conveyed by the least-significant bits of pixel values). The image data may be restored to its original form by determining which region 48 an out-of-gamut pixel corresponds to and mapping the out-of-gamut pixel to the in-gamut point corresponding to the region 48. This embodiment may be applied to any one or more channels (e.g. to one or more chroma values, a luminance value, a luminance value and a chroma value, a luminance value and two chroma values or the like).

Another example embodiment exploits cases in which a series of two or more pixels have the same pixel value(s). In this example embodiment, a pixel is located for which one or more adjacent pixels have one or more pixel values that are the same as one another. For example, the pixel may be one of a group of adjacent pixels for which the chroma values are all the same or for which the chroma and luminance values are all the same.

The values for the pixel are mapped to a corresponding out-of-gamut point. The pixel values can be subsequently restored by applying a predetermined mapping to map back to the original pixel values from the values of the corresponding out-of-gamut point.

Optionally the corresponding out-of-gamut point is selected from one of a plurality of available corresponding out-of-gamut points. The selection of a particular one of the plurality of available out-of-gamut points may indicate how many adjacent pixels share the same pixel value(s). The number of adjacent pixels that share the same pixel value(s) may be indicated in other ways. For example, the number of adjacent pixels that share the same pixel value(s) could be predetermined, such that any out-of-gamut point is known to indicate the start of a block of pixels sharing the same pixel value(s) of predetermined length or dimension. For another example, the number of pixels in a series of adjacent pixels that share the same pixel value(s) could be indicated by the modified pixel value(s) of a pixel in the series.

The pixel values for one or more adjacent pixels identified by the out-of-gamut pixel may then be overwritten with additional information. The additional information may be embodied in pixel values which correspond to in-gamut points. The additional information may subsequently be recovered by: detecting the out-of-gamut pixel; if any additional information is encoded in any pixel values for the out-of-gamut pixel, extracting that additional information; and reading the pixel values for one or more adjacent pixels as additional information.

The image data may be restored to its original form by mapping the out-of-gamut point to a corresponding in-gamut point according to a predetermined mapping and mapping the pixel values for the one or more adjacent pixels to the same corresponding in-gamut point. For example, the predetermined mapping may be based on a pixel value of the one or more adjacent pixels (e.g., the original pixel value(s) shared among the series of pixels could be indicated by the modified pixel value(s) of a pixel in the series).

In some embodiments, other spatial arrangements of pixels having one or more pixel values in common may be used. In some such embodiments, encoding additional information in image data comprises locating a pre-determined spatial arrangement of pixels having one or more pixel values that are the same as one another and replacing at least one pixel value of a reference pixel in the located spatial arrangement with a reference pixel value defining an out-of-gamut point. The pixel values of the out-of-gamut reference pixel may indicate the pre-determined spatial arrangement of the other pixels in the located arrangement relative to the reference pixel (e.g., pixel values may be used to indicate the dimensions of a rectangular block of pixels extending from the reference pixel). The pixel values for the other pixels in the located spatial arrangement may then be overwritten with additional information. The additional information may subsequently be recovered by: detecting the out-of-gamut reference pixel; if any additional information is encoded in any pixel values for the out-of-gamut reference pixel, extracting that additional information; locating the other pixels in the spatial arrangement corresponding to the reference pixel based on the pre-determined spatial arrangement and the location of the reference pixel; and reading the pixel values of the other pixels in the spatial arrangement as additional information.

Figure 6:
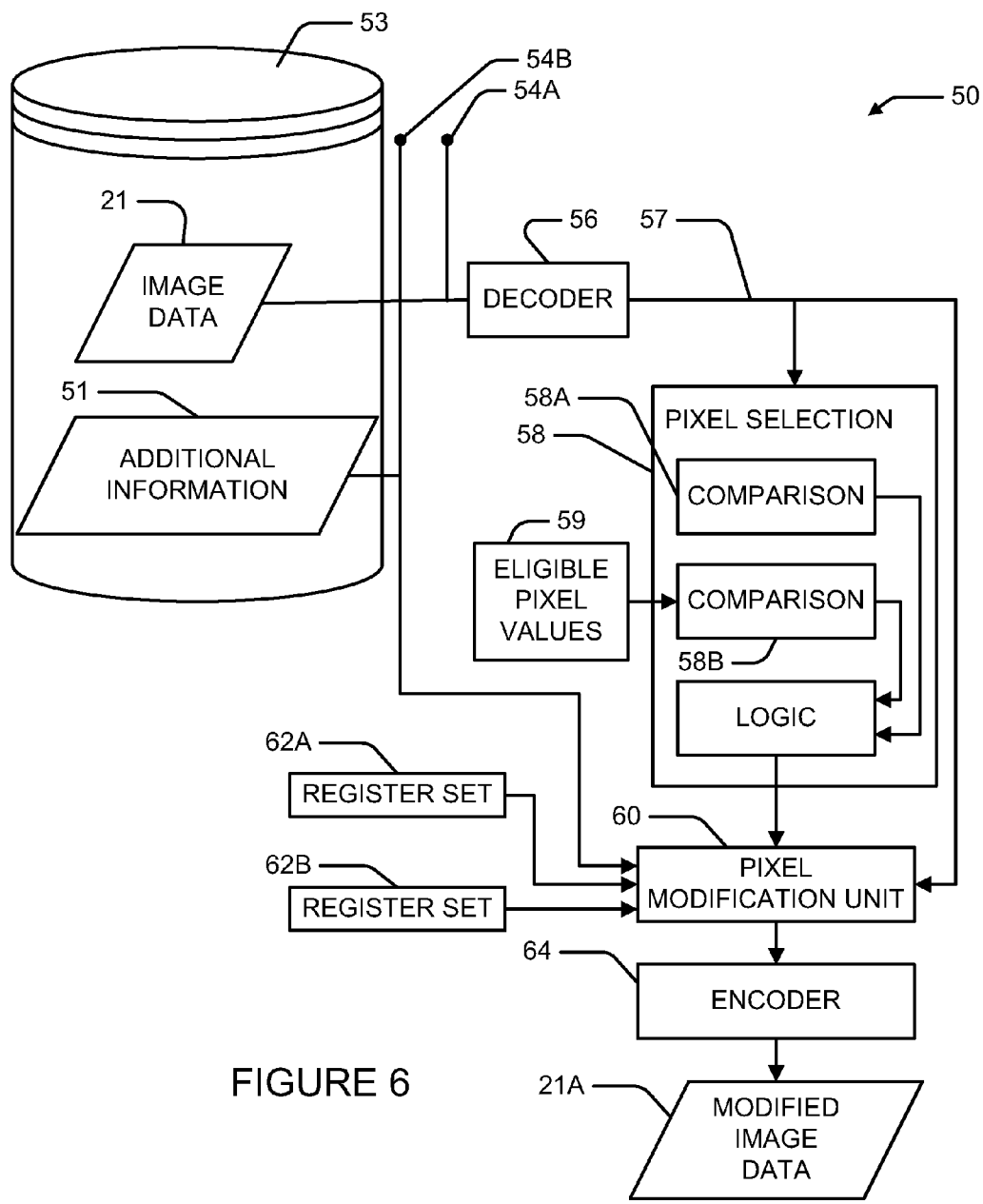
FIG. 6 is a block diagram illustrating an encoding apparatus according to an example embodiment.

FIG. 6 shows encoding apparatus 50 according to an example embodiment. Encoding apparatus 50 can access image data 21 and additional information 51 to be encoded in image data 21. Additional information 51 may, for example, comprise metadata related to image data 21 but is not limited to metadata.

In the illustrated embodiment, image data 21 is stored in a data storage device 53 such as a memory, disc drive or the like. In the alternative or additionally, image data 21 may be received at an input 54A and additional information 51 may be received at an input 54B. A decoder 56 decodes image data 21. Pixel values (for example, the values of L, U, and V coordinates for each pixel) are available at the output 57 of decoder 56.

A pixel selection unit 58 identifies pixels that are candidates for replacement with out-of-gamut points. Pixel selection unit 58 may apply various criteria such as those described above to determine whether a particular pixel is a candidate for replacement. In the illustrated embodiment, pixel selection unit 58 comprises a first comparison unit 58A configured to compare one or more pixel values for a current pixel to corresponding pixel values for a previous pixel. First comparison unit 58A may, for example, be applied to determine if the current pixel corresponds to a color point that is the same as that of the previous pixel and, if so, to make the current pixel eligible for modification.

Pixel selection unit 58 also comprises a second comparison unit 58B. Second comparison unit 58B is configured to compare one or more pixel values for a current pixel to corresponding stored pixel value(s) 59. Second comparison unit 58B may, for example, be applied to determine if the current pixel corresponds to a color point that has been predetermined as corresponding to pixels eligible for modification.

Pixel modification unit 60 is connected to receive additional information 51 and a signal from pixel selection unit 58 indicating whether or not the current pixel is eligible for modification. If there is additional information 51 to be transmitted and the current pixel is eligible for modification as indicated by pixel selection unit 58 then pixel modification unit 60 writes new values for one or more pixel values of the current pixel. The new values are determined based, at least in part, upon the additional information 51.

In the illustrated example embodiment, pixel modification unit 60 comprises $2^N$ register sets 62 (register sets 62A and 62B are shown—corresponding to the case where N=1). Each register set contains pixel values corresponding to a different out-of-gamut point. Pixel modification unit overwrites pixel values for the current pixel with the pixel values from the one of register sets 62 which corresponds to the next piece of additional information 51 to be transmitted. For example, pixel modification unit 60 may overwrite one or more of the pixel values for the current pixel with the pixel values from register set 62A if the next bit of additional information 51 is a '0'. Pixel modification unit 60 may overwrite the pixel values for the current pixel with the pixel values from register set 62B if the next bit of additional information 51 is a '1'. For the case where N>1, pixel modification unit 60 may overwrite the pixel values for the current pixel with the pixel values from register set associated with the value of the next N bits of additional information 51.

Encoder 64 encodes the image data as modified by pixel modification unit 60. Encoder 64 may, for example, comprise a JPEG encoder, an MPEG encoder or an encoder for some other still or video image format. Modified image data 21A may be stored, transmitted by streaming, file transfer or the like, written onto a medium such as a DVD or other wise utilized.

Advantageously, in some embodiments, image data encoded with additional information 51 as described herein is compatible with existing image data encoding, decoding and transporting protocols.

Figure 7:
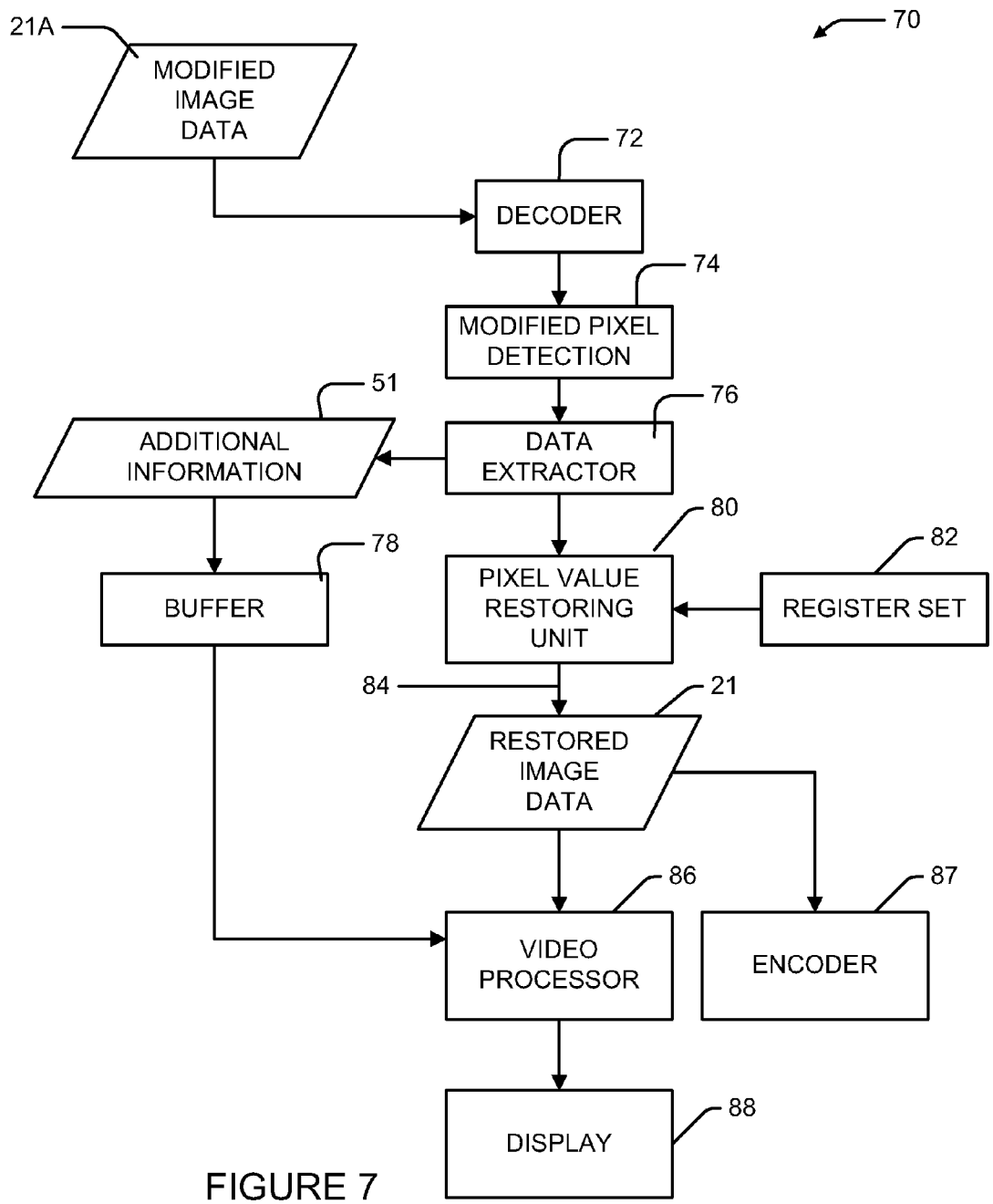
FIG. 7 is a block diagram illustrating a decoding apparatus according to another example embodiment.

FIG. 7 shows example apparatus 70 for extracting additional information 51 from image data. Apparatus 70 comprises a decoder 72. A modified pixel detector 74 detects pixels having modified values. Modified pixel detector 74 may, for example, compare one or more pixel values of the current pixel to one or more criteria. For example, the pixel values may be compared to one or more thresholds indicative that the pixel values correspond to an out-of-gamut point.

Data extractor 76 determines the points or regions to which out-of-gamut pixels belong, and determines values of additional information 51 that has been added to the image data based on correspondence between the determined points or regions and values for additional information. Data extractor 76 writes the determined values for the additional information 51 to a buffer 78. In some embodiments, data extractor 76 and modified pixel detector 74 are combined.

A pixel value restoring unit 80 restores out-of-gamut pixel values to their original values. Pixel value restoring unit 80 may, for example, be configured to write predetermined pixel value(s) from a register set 82 to the current pixel or to copy pixel value(s) from a previously-processed pixel (e.g. an adjacent pixel).

Restored image data 21B is presented at output 84. In the illustrated embodiment, the restored image data is processed for display by a video processor 86. Video processor 86 is connected to receive additional information 51 and to process the restored image data in a manner controlled at least in part by additional information 51 for display on a display 88. An encoder 87 may be provided for encoding the restored image data 21B for transmission to another display, an image store, another destination, or the like.

It is desirable but not mandatory that the image data be restored to its original state after additional information 51 has been extracted. In some alternative embodiments, the image data is restored to a close-enough approximation of the original state by, for example, replacing pixel values for out-of-gamut pixels with pixel values that are the same as those for one or more adjacent pixels or with pixel values interpolated from corresponding values from two or more nearby pixels. This may be done without regard to whether the image data is restored exactly to its original state.

In some embodiments, the pixels selected to carry additional information 51 may be pixels that have pixel values that result in the pixels having a reduced impact on the overall appearance of the image displayed in response to the image data. For example, the pixels selected to carry additional information 51 may have luminance values below a threshold. Changes to chroma values for such pixels may not be noticeable or may have only an effect on the appearance of the displayed image that is small enough to be unobjectionable. In some embodiments, an upper luminance threshold for pixels selected to carry additional information 51 may be based on peak scene luminance.

In some embodiments, pixel values are presented in a format that includes a value specifying light intensity or brightness (luma values) and values specifying color (chroma values). An example is that pixels may have values in a LUV or YUV color space. In some such embodiments, additional information 51 is encoded in chroma values only (while luma values are unaltered).

Additional information may comprise any information at all. In some embodiments the additional information has a specific relationship to the image data. For example, the additional information may comprise: meta data for use by a downstream image processing apparatus in processing, rendering or displaying an image represented by the image data; a low-spatial resolution version of the image data or of a luminance channel of the image data suitable for use in driving a backlight in a local-dimming or dual-modulation type of display and/or combining with the image data to yield a higher-dynamic range version of image(s) in the image data; information describing the image(s) represented by the image data; or the like.

As described above, there are a wide range of possible embodiments of this invention. Some embodiments may differ from one another according to the specific protocol used to carry additional information. The protocols may differ from one another, for example, in ways such as:

which in-gamut points are eligible to be replaced by out-of-gamut points;
how many distinct out-of-gamut points or regions are provided;
how is additional information encoded into out-of-gamut points;
how is the image data restored after additional information is extracted;
etc.

Some embodiments apply a predetermined protocol. Image data is modified to carry additional information according to the predetermined protocol by an encoder configured to implement the predetermined protocol and the additional information is subsequently extracted from the modified image data by a decoder configured to implement the predetermined protocol. In other embodiments the protocol for modifying image data to carry additional information is configurable. In configurable embodiments, control information regarding the current protocol being used may be transmitted between an encoder and a decoder either with the image data or via an alternative data transmission path. For example, the control information may be delivered by way of a sideband messaging stream. One example of such a stream is SEI messages in image data encoded using an AVC (e.g. ITU-T H.264) codec. Such sideband messaging may transmit information regarding the mode in which additional information is embedded into image data and/or the mappings between out-of-gamut points and in-gamut points.

Figure 8:
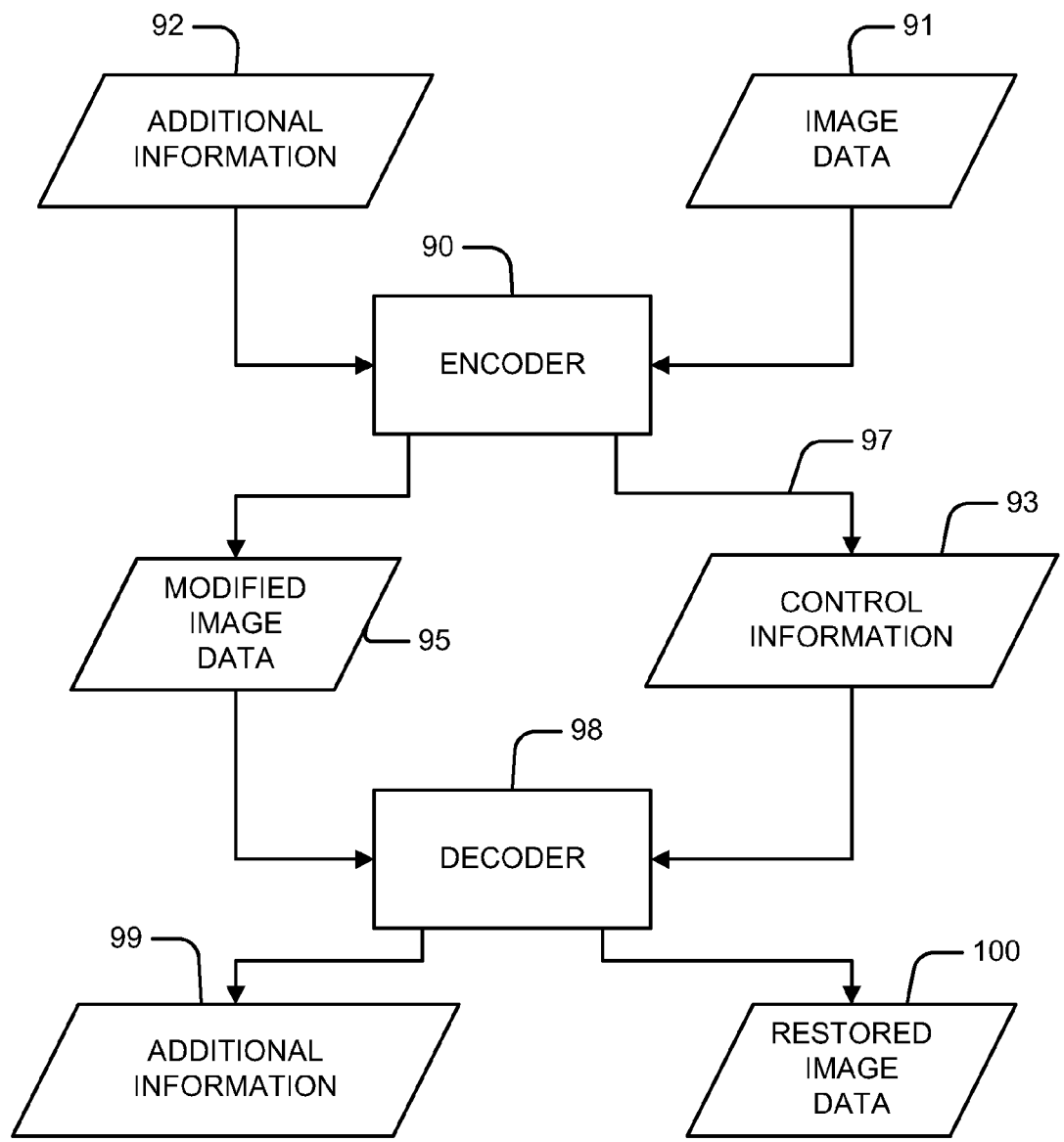
FIG. 8 is a block diagram illustrating encoding and decoding apparatus that share control information that specifies aspects of a protocol for carrying additional information in modified image data.

Typically the control information is sent from the encoder or distributor of image data to the decoder of the image data and indicates what protocol the decoder ought to use to extract the additional information and restore the image data. An example embodiment is illustrated in FIG. 8. An encoder 90 processes image data 91 according to a protocol to produce modified image data 95 which has encoded in it additional information 92 using out-of-gamut points. Encoder 90 passes modified image data 95 to decoder 98. Encoder 90 also passes control information 93 to decoder 98 by way of a data path 97. Data path 97 may, for example, comprise a sideband, information encapsulated together with modified image data 95 in a data structure or stream, a separate data transmission path, or the like. Decoder 98 configures itself to extract the additional information from the modified image data 95 according to control information 93 and then processes modified image data 95 to yield a copy 99 of the additional information and restored image data 100.

In alternative embodiments, the decoder may transmit information to an encoder or distributor of image data specifying one or more aspects of a protocol for encoding additional information in image data to be delivered to the decoder.

In an example embodiment, a decoder receives control information specifying a protocol by way of which image data has been modified to carry additional information. The decoder configures itself according to the control information to extract the additional information and to restore the image data. The decoder then processes the image data to produce the restored image data and the additional information.

Certain implementations of the invention comprise computer processors which execute software instructions which cause the processors to perform a method of the invention. For example, one or more processors may be configured to implement methods illustrated in FIG. 2 by executing software instructions in a program memory accessible to the processors. Programmed processors may optionally be applied to implement some or all of the components of the apparatus of FIGS. 6 and 7 (e.g., the components of the apparatus of FIGS. 6 and 7 may be implemented in a single programmed processor). The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such alterations, modifications, permutations, additions, combinations and sub-combinations as are within their true spirit and scope.

Accordingly, the invention may be embodied in any of the forms described herein, including, but not limited to the following Enumerated Example Embodiments (EEEs) which describe structure, features, and functionality of some portions of the present invention:

EEE1. A method for encoding additional information in image data, the image data comprising pixel values defining a plurality of in-gamut points within a gamut for a plurality of pixels, the method comprising:
  selecting one or more of the pixels; and
  mapping one or more pixel values of each of the selected pixels to one or more corresponding mapped values;
  wherein at least one of the one or more mapped values defines an out-of-gamut point and at least one of the one or more mapped values corresponds to one or more bits of the additional information.

EEE2. A method according to EEE 1 wherein the out-of-gamut point corresponds to the one or more bits of the additional information.

EEE3. A method according to EEE 1 wherein at least one of the one or more mapped values corresponds to at least one of the one or more pixel values.

EEE4. A method according to EEE 3 wherein at least one of the one or more mapped values defining the out-of-gamut point corresponds to at least one of the one or more pixel values.

EEE5. A method according to EEE 4 wherein mapping the at least one pixel value mapped to the at least one mapped value defining the out-of-gamut point comprises copying a plurality of lower order bits of the at least one pixel value to the at least one mapped value.

EEE6. A method according to EEE 1 wherein selecting one or more of the pixels comprises selecting one or more of the pixels based on pixel values thereof.

EEE7. A method according to EEE 6 wherein selecting one or more of the pixels based on pixel values thereof comprises selecting one or more of the pixels based on one or more pixel values thereof matching one or more pre-determined pixel values.

EEE8. A method according to EEE 6 wherein selecting one or more of the pixels based on pixel values thereof comprises selecting one or more of the pixels based on one or more pixel values thereof matching one or more pixel values of a non-selected pixel.

EEE9. A method according to EEE 8 wherein the non-selected pixel is adjacent to at least one of the one or more selected pixels.

EEE10 A method according to EEE 8 wherein the non-selected pixel is the first pixel in a frame of image data.

EEE11 A method according to EEE 8 wherein the non-selected pixel is the first pixel in a row of image data.

EEE12 A method according to EEE 1 wherein the additional information comprises metadata associated with the image data.

EEE13 A method according to EEE 3 comprising mapping each of the one or more mapped values defining the out-of-gamut point to corresponding recovered values defining an in-gamut point.

EEE14 A method according to EEE 13 comprising processing the image data in a manner controlled at least in part by the additional information.

EEE15 A method for decoding additional information encoded in image data, the image data comprising pixels values defining a plurality of in-gamut points within a gamut and one or more out-of-gamut points for a plurality of pixels, the method comprising:
  identifying one or more pixel values of an out-of-gamut pixel in the image data, the one or more pixel values defining an out-of-gamut point;
  identifying one or more bits of additional information corresponding to the one or more identified pixel values; and
  outputting the one or more bits.

EEE16 A method according to EEE 15 comprising mapping at least one of the one or more identified pixel values to corresponding mapped values defining an in-gamut point.

EEE17 A method according to EEE 15 wherein identifying one or more bits of additional information comprises determining whether the out-of-gamut point occurs in one of a plurality of non-overlapping regions of color space, each of the plurality of non-overlapping regions associated with a value of one or more bits.

EEE18 A method according to EEE 15 wherein identifying one or more bits of additional information comprises associating the out-of-gamut point with a value of one or more bits according to a pre-determined relationship.

EEE19 A method according to EEE 15 wherein identifying one or more bits of additional information comprises reading one or more lower order bits of the one or more identified pixel values.

EEE20 A method according to EEE 15 wherein identifying one or more bits of additional information comprises reading one or more bits of a pixel value of a pixel having a pre-determined spatial relationship with the out-of-gamut pixel.

EEE21 A method according to EEE 20 wherein identifying one or more bits of additional information comprises reading one or more bits of a pixel value of a pixel adjacent to the out-of-gamut pixel.

EEE22 A method according to EEE 16 wherein the in-gamut point corresponds to the out-of-gamut point.

EEE23 A method according to EEE 16 wherein the in-gamut point is defined by pixel values of a pixel having a pre-determined spatial relationship with the out-of-gamut pixel.

EEE24 A method according to claim 23 wherein the is defined by pixel values of a pixel adjacent to the out-of-gamut pixel.

EEE25 A method according to EEE 16 wherein the in-gamut point is defined by pixel values of a pixel at a pre-determined location in a frame of image data.

EEE26 A method according to EEE 16 wherein the in-gamut point is defined by pixel values of a pixel at a pre-determined location in a row of image data.

EEE27 A method according to EEE 16 wherein mapping at least one of the one or more identified pixel values comprises setting one or more higher order bits of the at least one identified pixel value to zero and preserving the lower order bits.

EEE28 A method for encoding additional information in image data, the image data comprising pixel values defining in-gamut points within a gamut for a plurality of pixels, the method comprising:
 selecting one or more of the pixels;
 mapping one or more pixel values for each of the selected pixels to correspond to one of a plurality of out-of gamut points;
 wherein the out-of-gamut point to which the pixel values are mapped corresponds to one or more bits of the additional information.

EEE29 A method according to EEE 28 wherein the additional information comprises metadata associated with the image data.

EEE30 A method for decoding additional information from image data, the method comprising:
 identifying out-of-gamut pixels in the image data;
 identifying one or more bits corresponding to each of the out-of-gamut pixels; and
 outputting the one or more bits.

EEE31 A method according to EEE 29 comprising mapping each of the out-of-gamut pixels to a corresponding in-gamut pixel.

EEE32 A method according to EEE 31 comprising processing the image data in a manner controlled at least in part by the additional information.

EEE33 Apparatus for encoding additional information in image data, the image data comprising pixel values defining a plurality of in-gamut points within a gamut for a plurality of pixels, the apparatus comprising:
 a pixel selection unit configured to select one or more of the pixels; and
 a pixel modification unit configured to map one or more pixel values of each of the selected pixels to one or more corresponding mapped values;
 wherein at least one of the one or more mapped values defines an out-of-gamut point and at least one of the one or more mapped values corresponds to one or more bits of the additional information.

EEE34 Apparatus for decoding additional information encoded in image data, the image data comprising pixels values defining a plurality of in-gamut points within a gamut and one or more out-of-gamut points for a plurality of pixels, the apparatus comprising:
 a modified pixel detection unit configured to detect out-of-gamut pixels in the image data; and
 a data extractor configured to extract one or more bits of additional information corresponding to pixel values of out-of-gamut pixels detected by the modified pixel detection unit.

EEE35 Apparatus according to EEE 34 comprising a pixel value restoring unit configured to map the pixel values of the out-of-gamut pixels defining out-of-gamut points to corresponding restored values defining in-gamut points.

EEE36 Apparatus according to EEE 35 wherein the apparatus is configured to receive control information and to configure at least one of the data extractor and the pixel value restoring unit according to the control information.

EEE37 Apparatus according to EEE 34 wherein the apparatus is configured to receive control information and to configure the data extractor according to the control information.

EEE38 Methods comprising any new, useful and inventive step, act, combination of steps and/or acts, or subcombination of steps and/or acts described herein.

EEE39 Apparatus comprising any new, useful and inventive feature, means, combination of features and/or means, or subcombination of features and/or means described herein.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather features and aspects of one example can readily be interchanged with other examples. Notably, not every benefit described herein need be realized by each example of the present invention; rather any specific example may provide one or more of the advantages discussed above. In the claims, elements and/or operations do not imply any particular order of operation, unless explicitly stated in the claims. It is intended that the following claims and their equivalents define the scope of the invention.

Accordingly, the scope of the invention is to be construed in accordance with the substance defined by the following claims.

What is claimed is:

1. A method for encoding additional information in image data by video encoder, the image data comprising pixel values defining a plurality of in-gamut points within a gamut for a plurality of pixels, the method of comprising:

selecting one or more of the pixels; and mapping one ore more pixel values of each of the selected pixels to one or more corresponding mapped values;

wherein at least one of the one or more mapped values defines an out-of-gamut point and at least one of the one or more mapped values corresponds to one or more bits of the additional information;

wherein at least one of the one or more mapped values defining the out-of gamut point corresponds to at least one of the one or more pixel values;

wherein mapping the at least one pixel value mapped to the at least one mapped value defining the out-of-gamut point comprises copying a plurality of lower order bits of the at least one pixel value to the at least one mapped value.

2. A method according to claim 1, wherein selecting one or more of the pixels comprises selecting one or more of the pixels based on pixel values thereof.

3. A method according to claim 2 wherein selecting one or more of the pixels based on pixel values thereof comprises selecting one or more of the pixels
based on one or more pixel values thereof matching one or more pre-determined pixel values.

4. A method according to claim 2 wherein selecting one or more of the pixels based on pixel values thereof comprises selecting one or more of the pixels based on one or more pixel values thereof matching one or more pixel values of a non-selected pixel.

5. A method according to claim 4 wherein the non-selected pixel is adjacent to at least one of the one or more selected pixels.

6. A method according to claim 4 wherein the non-selected pixel is the first pixel in a frame of image data.

7. A method according to claim 4 wherein the non-selected pixel is the first pixel in a row of image data.

8. A method according to claim 1, wherein the additional information comprises metadata associated with the image data.

9. A method according to claim 1, further comprising mapping each of the one or more mapped values defining the out-of-gamut point to corresponding recovered values defining an in-gamut point.

10. A method according to claim 9 comprising processing the image data in a manner controlled at least in part by the additional information.

11. A method for decoding additional information encoded in image data by a video decoder, the image data comprising pixels values defining a plurality of in-gamut points within a gamut and one or more out-of-gamut points for a plurality of pixels, the method comprising:

identifying one or more pixel values of an out-of-gamut pixel in the image data, the one or more pixel values defining an out-of-gamut point;

identifying one or more bits of additional information corresponding to the one or more identified pixel values; and outputting the one or more bits;

wherein the additional information was encoded by selecting one or more of the pixels of original image data and mapping one or more pixel values of each of the selected pixels to one or more corresponding mapped values;

wherein at least one of the one or more mapped values defines an out-of-gamut point and at least one of the one or more mapped values corresponds to one or more bits of the additional information;

wherein at least one of the one or more mapped values corresponds to at least one of the one or more pixel values;

wherein at least one of the one or more mapped values defining the out-of-gamut point corresponds to at least one of the one or more pixel values; and wherein mapping the at least one pixel value mapped to the at least one mapped value defining the out-of-gamut point comprises copying a plurality of lower order bits of the at least one pixel value to the at least one mapped value.

12. A method according to claim 11, wherein the additional information comprises meta data utilized by a processing apparatus in processing, rendering or displaying an image represented by the encoded image data.

13. A method according to claim 11, wherein the additional information comprises a low-spatial resolution version of the image data or of a luminance channel of the image data suitable for use in driving a backlight in a local-dimming or dual-modulation type of display.

14. A method according to claim 11, wherein the additional information is utilized by a dual-modulation imaging device.

15. A method according to claim 11, wherein the additional information comprises an identification of a decoder protocol.

16. A method according to claim 11, wherein the additional information is utilized to restore a Higher Dynamic Range (HDR) image represented by the image data.

* * * * *